United States Patent [19]
Nagashima et al.

[11] Patent Number: 5,213,613
[45] Date of Patent: May 25, 1993

[54] INK, AND INK-JET RECORDING METHOD AND INSTRUMENT USING THE SAME

[75] Inventors: Akira Nagashima, Tokyo; Shinichi Tochihara, Hadano; Osamu Nishiwaki, Atsugi; Kumiko Mafune, Kawasaki, all of Japan

[73] Assignee: Canon Kabushiki Kaisha, Tokyo, Japan

[21] Appl. No.: 949,158

[22] Filed: Sep. 23, 1992

[30] Foreign Application Priority Data

Sep. 26, 1991 [JP] Japan ................................ 3-273451

[51] Int. Cl.5 ............................................. C09D 11/02
[52] U.S. Cl. ................................... 106/20 R; 106/20 D
[58] Field of Search ............................. 106/20 R, 20 D

[56] References Cited

U.S. PATENT DOCUMENTS

| | | | |
|---|---|---|---|
| 3,993,493 | 11/1976 | McLaren et al. | 106/20 R |
| 4,137,083 | 1/1979 | Hedrick | 106/20 R |
| 4,455,168 | 6/1984 | Shimada et al. | 106/20 D |
| 4,781,758 | 11/1988 | Gendler et al. | 106/20 D |
| 4,789,400 | 12/1988 | Solodar et al. | 106/20 D |
| 5,017,224 | 5/1991 | Tomita et al. | 106/20 R |
| 5,017,644 | 5/1991 | Fuller et al. | 106/20 D |
| 5,019,164 | 5/1991 | Tomita et al. | 106/20 R |

*Primary Examiner*—Mark L. Bell
*Assistant Examiner*—Helene Klemanski
*Attorney, Agent, or Firm*—Fitzpatrick, Cella, Harper & Scinto

[57] ABSTRACT

Disclosed herein is an ink comprising a recording agent and a liquid medium dissolving or dispersing the recording agent therein, wherein the ink contains an imide compound and at least one compound selected from the group consisting of urea, thiourea and derivatives thereof, and volatile alkaline compounds.

21 Claims, 3 Drawing Sheets

INK, AND INK-JET RECORDING METHOD AND INSTRUMENT USING THE SAME

BACKGROUND OF THE INVENTION

1. Field of the Invention

The present invention relates to an ink, and an ink-jet recording method and instruments making use of the ink, and more specifically to an ink which can provide prints excellent in water resistance and conduct recording on non-coated paper such as woodfree paper, medium-quality paper, bond paper and regenerated paper, i.e., so-called plain paper, which are commonly used in offices, and also on other recording materials, and an ink-jet recording method and instruments making use of such an ink.

2. Related Background Art

Inks with greatly various manners of being composed have been hitherto reported in respect of inks for writing utensils (fountain pens, marking pens, ball-point pens making use of a water-based ink, etc.) and for ink-jet recording. In particular, in recent years, detailed researches and developments have been made from various aspects such as compositions and physical properties of inks so that good recording can be conducted even on plain paper such as paper for copying, paper for reporting, notepaper, letter paper, bond paper and continuous business forms, which have been commonly used in offices.

For example, Japanese Patent Application Laid-Open No. 58-80366 has proposed a water-based ink in which an imide compound has been contained in a water-based ink composition so as to achieve the prevention of clogging of a nozzle part and to provide images excellent in print quality.

Even in such an ink which can provide prints with high quality, however, the following problem has been encountered: The resulting print is poor in water resistance because the ink is soluble in water, so that when waterdrops such as raindrops adhere to the print, or the print is immersed in water after printing, the ink runs out, resulting in deteriorated image density. In particular, a water-based ink for ink-jet recording, which serves to provide color images, is all the more likely to run because a dye having high solubility in water is used in order to make the chromaticity of the ink high.

Further, since water and low-boiling solvents are used in water-soluble ink compositions, such solvents vaporize as the time goes on when such ink compositions are stored for a long period of time, so that the viscosity of the ink compositions becomes higher. Accordingly, there is also a problem that such ink compositions become unsuitable for use in ink-jet recording which is constituted so as to eject an ink out of a minute orifice or orifices, resulting in uneven ink droplets.

SUMMARY OF THE INVENTION

It is accordingly an object of this invention to provide an ink which can provide prints having sufficient water resistance without adversely affecting the image quality of the prints and the like when conducting recording on plain paper commonly used in offices, and permits printing without the least problem and with high quality even after stored for a long period of time, and an ink-jet recording method and instruments making use of such an ink.

The above object can be achieved by the present invention described below. According to the present invention, there is thus provided an ink comprising a recording agent and a liquid medium dissolving or dispersing the recording agent therein, wherein the ink contains at least one compound selected from urea, thiourea and derivatives thereof, and volatile alkaline compounds, and an imide compound in combination.

According to the present invention, there is also provided an ink-jet recording method comprising ejecting droplets of an ink out of an orifice in accordance with a recording signal to make a record on a recording material, wherein the ink comprises a recording agent and a liquid medium dissolving or dispersing the recording agent therein, and contains at least one compound selected from urea, thiourea and derivatives thereof, and volatile alkaline compounds, and an imide compound in combination.

According to the present invention, there is further provided a recording unit comprising an ink container portion with an ink held therein and a head from which the ink is ejected in the form of ink droplets, wherein said ink is the ink described above.

According to the present invention, there is still further provided an ink cartridge comprising an ink container portion with an ink held therein, wherein said ink is the ink described above.

According to the present invention, there is yet still further provided an ink-jet recording apparatus comprising a recording unit having an ink container portion with an ink held therein and a head from which the ink is ejected in the form of ink droplets, wherein said ink is the ink described above.

According to the present invention, there is yet still further provided an ink-jet recording apparatus comprising a head from which the ink is ejected in the form of ink droplets, an ink cartridge having an ink container portion with an ink held therein, and an ink feeder for feeding the ink from the ink cartridge to the recording head, wherein said ink is the ink described above.

DESCRIPTION OF THE PREFERRED EMBODIMENTS

Figure 1:
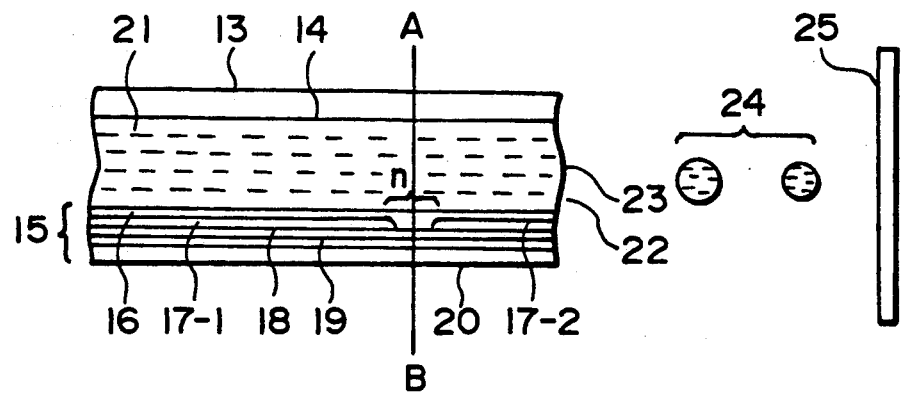
FIG. 1 is a longitudinal cross-sectional view of a head of an ink-jet recording apparatus.

The present inventor has carried out an extensive investigation on various manners of ink compositions with a view toward providing prints improved in water resistance using water-soluble inks. As a result, it has been found that when an imide compound and at least one compound selected from urea, thiourea and derivatives thereof, and volatile alkaline compounds are contained in combination in an ink comprising a recording agent and a liquid medium dissolving or dispersing the recording agent therein, the water resistance of resulting prints is sharply improved without impairing print quality, and the properties of the ink remain good even after stored for a long period of time, so that the reliability of an ink-jet recording system is not impaired at all even when such an ink is used, leading to completion of the present invention.

The present invention will hereinafter be described more detail by the following preferred embodiments.

As exemplary preferred imide compounds useful in the practice of this invention, may be mentioned succinimide, glutarimide, maleimide, diglycolimide, glutazine and the like. Further, as other specific examples thereof, may be mentioned compounds represented by the following chemical formulae:

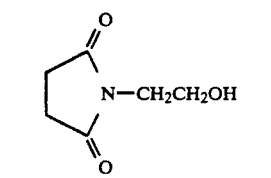
No. 1

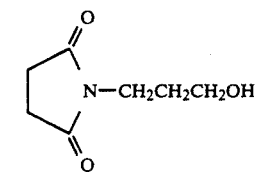
No. 2

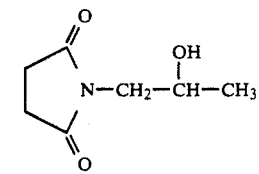
No. 3

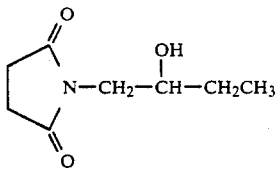
No. 4

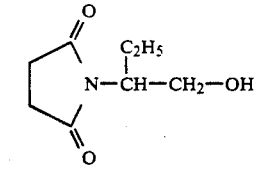
No. 5

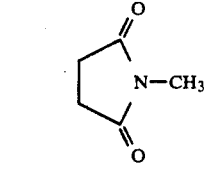
No. 6

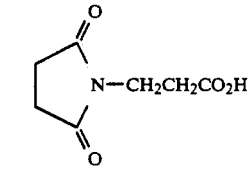
No. 7

-continued

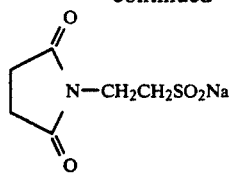
No. 8

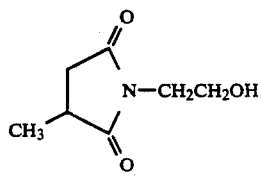
No. 9

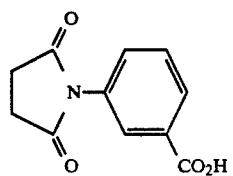
No. 10

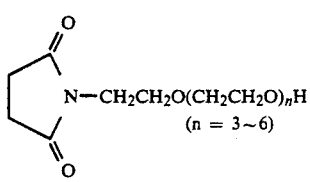
No. 11
(n = 3~6)

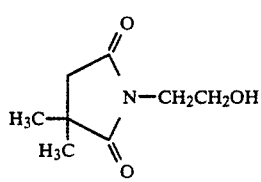
No. 12

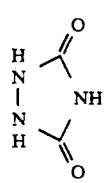
No. 13

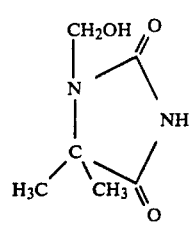
No. 14

No particular limitation is imposed on the compounds selected from urea, thiourea and derivatives thereof. However, as preferred compounds, may be mentioned urea; derivatives of urea such as 1,1-diethylurea, 1,3-diethylurea, 1,1-dimethylurea and 1,3-dimethylurea; thiourea; and derivatives of thiourea such as 1,1-diethylthiourea, 1,3-diethylthiourea, 1,1-dimethylthiourea and 1,3-dimethylthiourea. Since urea has a high water-retaining effect, the addition of urea can provide an ink which achieves the prevention of clogging and solidification at a low temperature. The reason why the combined use of at least one compound selected from urea, thiourea and the derivatives thereof, and the imide compound has a particular effect on water resistance is not understood clearly. However, it is inferentially believed that for example, an interaction between the imide compound and the compound selected from urea, thiourea and the derivatives thereof, an interaction between the imide compound and a hydrolyzate of the compound selected from urea, thiourea and the derivatives thereof, an interaction between their compounds and a dye, an interaction, from the viewpoint of electricity by way of example, between their compounds and the component of a recording agent, etc. may operate upon water resistance.

When the imide compound and the compound selected from urea, thiourea and the derivatives thereof are contained in combination, no particular limitation is imposed on their contents in the ink because they are affected deeply by the application and purpose of the ink, the kind of a coloring material used, the composition of the ink, etc. However, the imide compound and the compound selected from urea, thiourea and the derivatives thereof are preferably contained in ranges of from 0.2% to 40.0% by weight, more preferably, from 1.0% to 20.0% by weight, and of from 0.1% to 20.0% by weight, more preferably, from 0.5% to 15.0% by weight, respectively.

The proportion of the imide compound and compound selected from urea, thiourea and the derivatives thereof to be contained in combination is preferably about 1:3 to 10:1, more preferably, about 1:2 to 5:1.

Any proportions outside the above range lower the effect on water resistance, or reduce the reliability of the resulting ink when used in ink-jet recording because the balance of the proportions and rates of hydrolyses of the imide compound and the compound selected from urea, thiourea and the derivatives thereof, which exist in the ink, and the interactions and hydrolyzates for the respective hydrolyses is destroyed.

No particular limitation is imposed on the volatile alkaline compound useful in the practice of this invention. However, as preferred examples thereof, may be mentioned ammonia, triethylamine and alkylamines having 1 to 4 carbon atoms, such as monoethylamine, diethylamine, monomethylamine, dimethylamine and trimethylamine. It has heretofore been conducted to add a nonvolatile alkaline compound such as triethanolamine as a liquid medium. However, it remains in prints because it is a nonvolatile compound, and runs when waterdrops or the like adhere to the prints. Accordingly, such a compound has impaired the water resistance of the prints. On the contrary, the volatile alkaline compound such as ammonia vaporizes off upon printing and does not remain in prints. Therefore, the water resistance of the prints can be improved.

When the imide compound and the volatile alkaline compound are contained in combination, no particular limitation is imposed on their contents in the ink because they are affected deeply by the application and purpose of the ink, the kind of a coloring material used, the composition of the ink, etc. However, the imide compound and the volatile alkaline compound are preferably contained in ranges of from 0.1% to 20.0% by weight, more preferably, from 0.5% to 15.0% by weight, and of from 0.1% to 20.0% by weight, more preferably, from 0.5% to 15.0% by weight, respectively.

The proportion of the imide compound and volatile alkaline compound to be contained in combination is preferably about 1:1 to 8:1.

If the proportion of the volatile alkaline compound is higher than 1:1, the long-term reliability of the resulting ink, for example, fixing or clogging behavior at low temperatures, becomes deteriorated and moreover, the viscosity of the ink is increased by a sort of coloring material, so that the ink becomes hard to use.

If the proportion of the imide compound is higher than 8:1, fixing or clogging behavior of the resulting ink becomes deteriorated and moreover. Further, its stability in the ink is lowered by a sort of coloring material when stored for a long period of time, whereby the reliability upon ink-jet recording is reduced.

In this invention, it is also preferable to use, as a buffering agent, a salt of a weak acid such as lithium acetate, and a strong base such as lithium hydroxide, alone or in combination.

The proportion of the buffering agent in the ink is preferably about 0.10% to 5.0% by weight.

No particular limitation is imposed on the recording agent useful in the practice of this invention. Coloring materials such as various kinds of dyes and pigments may be used.

No particular limitation is imposed on the amount of these coloring agents to be used. However, it is preferable to use them in a range of, generally, from 0.1% to 15% by weight, more preferably, from 0.1% to 10% by weight based on the total weight of the ink.

In this invention, it is also preferable to add a pH adjustor to the ink so as to keep pH 5 to 10.

The ink of this invention may contain, in addition to the above components, various additives such as water-soluble organic solvents, surfactants, rust preventives, antiseptics, antioxidants, vaporization accelerators, chelating agents and water-soluble polymers as necessary.

The liquid medium useful in the practice of this invention is preferably a mixed solvent of water and a water-soluble organic solvent. As specific examples of the water-soluble organic solvent, may be mentioned amides such as dimethylformamide and dimethylacetamide; ketones such as acetone; ethers such as tetrahydrofuran and dioxane; polyalkylene glycols such as polyethylene glycol and polypropylene glycol; alkylene glycols whose alkylene moiety has 2 to 6 carbon atoms, such as ethylene glycol, propylene glycol, butylene glycol, triethylene glycol, 1,2,6-hexanetriol, thiodiglycol, hexylene glycol and diethylene glycol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 1,3-dimethyl-2-imidazolidinone; triethanolamine; sulfolane; dimethylsulfoxide; and the like.

The content of the water-soluble organic solvent in the ink is generally within a range of from 1% to 40% by weight, more preferably, from 3% to 30% by weight based on the total weight of the ink.

The content of water to be used in the ink is within a range of from 30 to 95% by weight. When the amount of water is less than 30% by weight, the solubility of the coloring material and the like is deteriorated, and the viscosity of the resulting ink is increased. It is hence not preferred to use water in such a small amount. On the other hand, when the amount of water is greater than 95% by weight, the vaporizing components are too great to satisfy sufficient fixing property.

The ink of this invention is particularly suitable for use in an ink-jet recording system of a type that an ink is ejected by the bubbling phenomenon of the ink caused by thermal energy. This recording system has a feature that the ejection of the ink becomes extremely stable, and no satellite dots generate. In this case, the thermal properties (for example, the specific heat, the coefficient of thermal expansion, the heat conductivity, etc.) of the ink may however be controlled in some cases.

The ink of this invention is desirably controlled so as to have, as its own physical properties, a surface tension of 30 to 68 dyn/cm and a viscosity of 15 cPs or lower, preferably 10 cPs or lower, more preferably 5 cPs or lower as measured at 25° C. from the viewpoint of solving the problem of water resistance of prints when recorded on plain paper or the like and at the same time, making the matching of the ink with an head for ink-jet recording good.

Accordingly, in order to control the physical properties of the ink to the above-described values and solve the problem on plain paper, it is preferred that the content of water in the ink of this invention be adjusted to from not less than 50% to not more than 95% by weight, preferably, from not less than 60% to not more than 95% by weight.

The ink according to this invention may suitably be used, in particular, in an ink-jet recording system of a type that recording is conducted by ejecting droplets of an ink by the action of thermal energy. It however goes without saying that the ink may also be used for general-purpose writing utensils.

As preferred methods and apparatus for conducting recording by using the ink according to this invention, may be mentioned a method and apparatus in which thermal energy corresponding to recording signals is applied to an ink within a recording head, and ink droplets are generated in accordance with the thermal energy.

Figure 2:
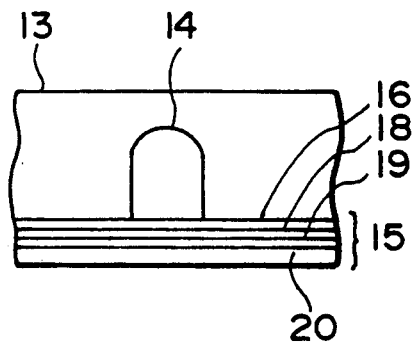
FIG. 2 is a transverse cross-sectional view of the head of the ink-jet recording apparatus.
Figure 3:
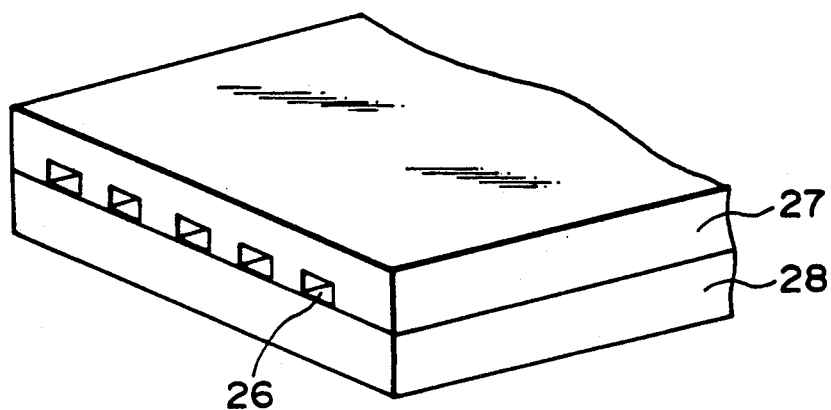
FIG. 3 is a perspective view of the appearance of a multi-head which is an array of such heads as shown in FIG. 1.

Examples of the construction of a head, which is a main component of such an apparatus, are illustrated in FIGS. 1, 2 and 3.

A head 13 is composed of a glass, ceramic or plastic plate or the like having an ink-passing channel 14 and a heating head 15, which is used for thermal recording (the drawing shows a head to which, however, is not limited), said heating head 15 being bonded to the plate. The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 having good heat radiating property and made of alumina or the like.

An ink 21 comes up to an ejection orifice 22 (a minute opening) and forms a meniscus 23 owing to a pressure P.

Now, upon application of electric signals to the electrodes 17-1, 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording material 25 in the form of recording droplets 24.

FIG. 3 illustrates an appearance of a multi-head composed of an array of a number of heads as shown in FIG. 1. The multi-head is formed by closely bonding a glass plate 27 having a number of channels 26 to a heating head 28 similar to the head as illustrated in FIG. 1. Incidentally, FIG. 1 is a cross-sectional view of the head 13 taken along the flow path of the ink, and FIG. 2 is a cross-sectional view taken along line A-B in FIG. 1.

Figure 4:
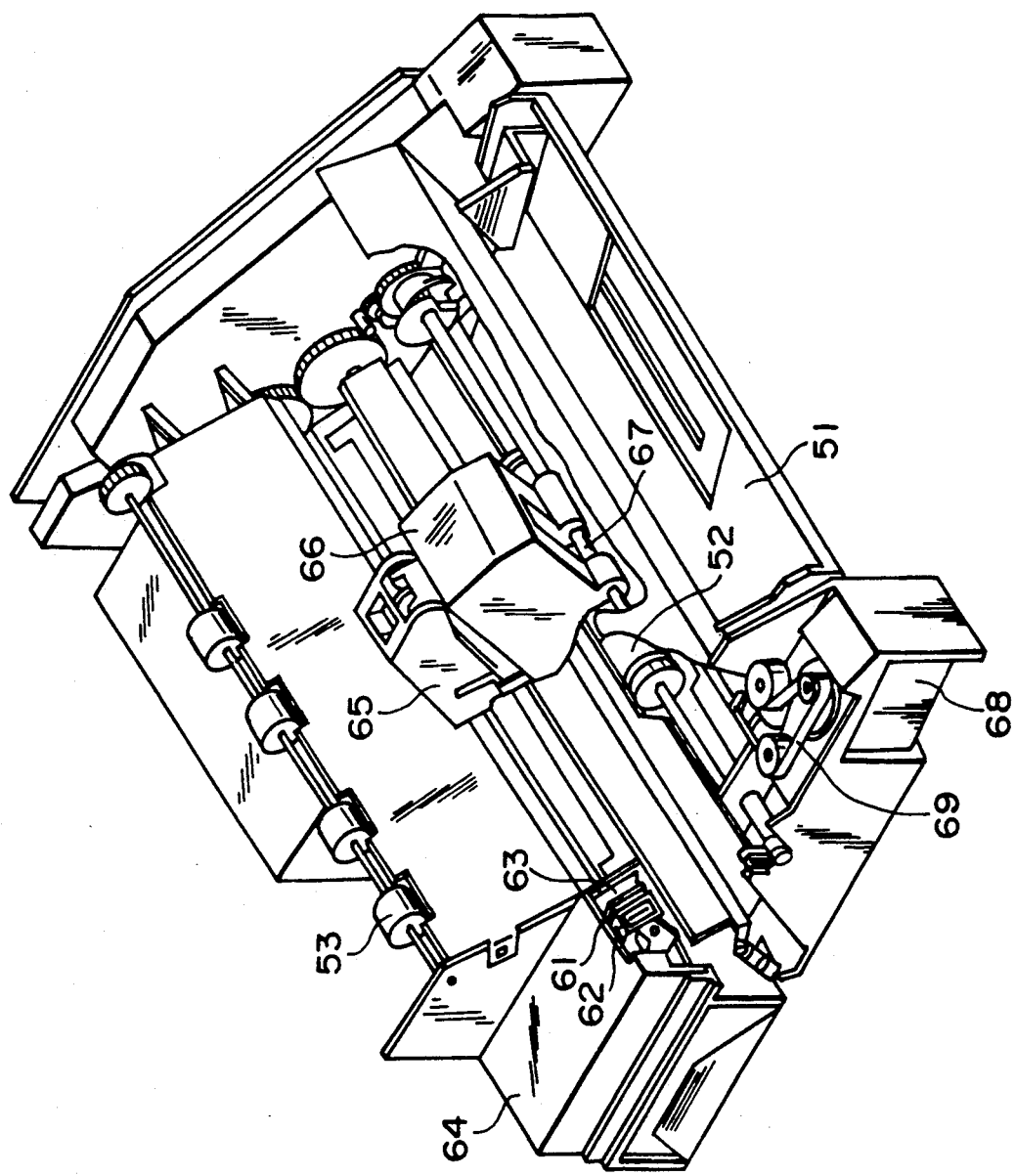
FIG. 4 is a perspective view of an illustrative ink-jet recording apparatus.

FIG. 4 illustrates an example of an ink-jet recording apparatus in which such a head has been incorporated. In FIG. 4, reference numeral 61 designates a blade serving as a wiping member, one end of which is a stationary end held by a blade-holding member to form a cantilever. The blade 61 is provided at the position adjacent to the region in which a recording head operates, and in this embodiment, is held in such a form that it protrudes to the course through which the recording head is moved. Reference numeral 62 indicates a cap, which is provided at the home position adjacent to the blade 61, and is so constituted that it moves in the direction perpendicular to the direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved. The above-described blade 61, cap 62 and absorbing member 63 constitute a recovery portion 64 for the recording head, where the blade 61 and absorbing member 63 remove off water, dust and-/or the like from the face of the ink-ejecting openings.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
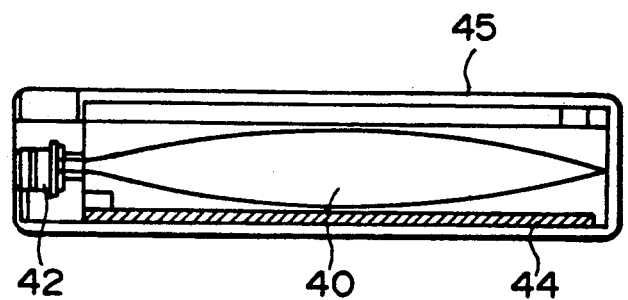
FIG. 5 is a longitudinal cross-sectional view of an ink cartridge.

FIG. 5 illustrates an exemplary ink cartridge in which an ink fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink absorbing member for receiving a waste ink. It is preferred in this invention that the ink container portion is formed of a polyolefin, in particular, polyethylene, at its surface with which the ink comes into contact. The ink-jet recording apparatus used in this invention may not be limited to the apparatus as described above in which the head and the ink cartridge are separately provided. Therefore, a device in which these members are integrally formed as shown in FIG. 6 can also be preferably used.

Figure 6:
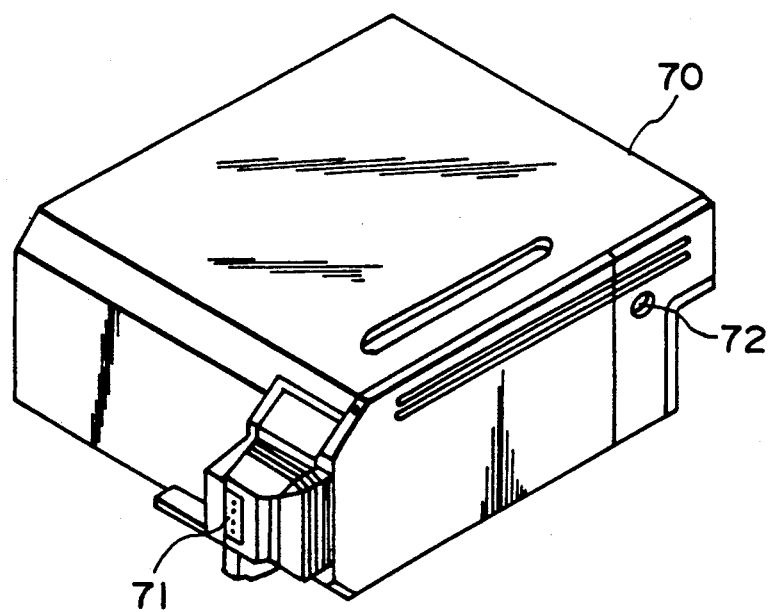
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In this invention, polyurethane, cellulose or polyvinyl acetate is preferably used as a material for the ink-absorbing member. Reference numeral 72 indicates an air passage for communicating the interior of the recording unit 70 with the atmosphere. This recording unit 70 can be used in place of the recording head shown in FIG. 4, and is detachably installed on the carriage 66.

The present invention will hereinafter be described more specifically by the following Examples and Comparative Examples. Incidentally, all designations of "part" or "parts" and "%" as will be used in the following examples mean part or parts by weight and % by weight unless expressly noted.

EXAMPLE 1 TO 14

After their corresponding components as described below were mixed and thoroughly stirred into solutions, the resulting solutions were separately filtered under pressure through a "Fluoropore Filter" (trade name; product of Sumitomo Electric Industries, Ltd.) having a pore size of 0.45 μm, thereby preparing respective inks according to Examples of this invention.

Ink composition of Example 1:
| | |
|---|---|
| C.I. Food Black 2 | 4 parts |
| Glycerol | 5 parts |
| Ethyl alcohol | 2 parts |
| Urea | 5 parts |
| Succinimide | 10 parts |
| Water | 74 parts |

Ink composition of Example 2:
| | |
|---|---|
| C.I. Direct Black 154 | 3 parts |
| Diethylene glycol | 10 parts |
| Urea | 3 parts |
| 1,1-Diethylurea | 4 parts |
| Glutarimide | 6 parts |
| Water | 74 parts |

Ink composition of Example 3:
| | |
|---|---|
| C.I. Direct Black 154 | 5 parts |
| Diethylene glycol | 10 parts |
| Isopropyl alcohol | 2 parts |
| 1,1-Diethylurea | 4 parts |
| Succinimide | 6 parts |
| Water | 73 parts |

Ink composition of Example 4:
| | |
|---|---|
| C.I. Acid Red 35 | 2 parts |
| Glycerol | 7 parts |
| Isopropyl alcohol | 3 parts |
| Thiourea | 7 parts |
| Succinimide | 16 parts |
| Water | 65 parts |

Ink composition of Example 5:
| | |
|---|---|
| C.I. Food Black 2 | 4 parts |
| Glycerol | 5 parts |
| Ethyl alcohol | 2 parts |
| Triethylamine | 5 parts |
| Succinimide | 7 parts |
| Water | 77 parts |

Ink composition of Example 6:
| | |
|---|---|
| C.I. Direct Black 154 | 3 parts |
| Diethylene glycol | 10 parts |
| Ammonia | 6 parts |
| Succinimide | 8 parts |
| Water | 73 parts |

Ink composition of Example 7:
| | |
|---|---|
| C.I. Direct Black 154 | 5 parts |
| Diethylene glycol | 10 parts |
| Isopropyl alcohol | 2 parts |
| Monoethylamine | 2 parts |
| Glutarimide | 12 parts |
| Water | 69 parts |

Ink composition of Example 8:
| | |
|---|---|
| C.I. Acid Red 35 | 2 parts |
| Glycerol | 7 parts |
| Isopropyl alcohol | 3 parts |
| Ammonia | 3 parts |
| Succinimide | 10 parts |
| Water | 75 parts |

Ink composition of Example 9:
| | |
|---|---|
| C.I. Food Black 2 | 4 parts |
| Glycerol | 5 parts |
| Ethyl alcohol | 2 parts |
| Lithium acetate | 1 part |
| 1,3-Diethylthiourea | 3 parts |
| Succinimide | 8 parts |
| Compound No. 13 | 2 parts |
| Water | 75 parts |

Ink composition of Example 10:
| | |
|---|---|
| C.I. Food Black 2 | 2 parts |
| Thioglycol | 10 parts |
| Isopropyl alcohol | 1 parts |
| 1,1-Diethylurea | 3 parts |
| Succinimide | 12 parts |
| Water | 72 parts |

Ink composition of Example 11:
| | |
|---|---|
| C.I. Food Black 2 | 2 parts |
| Glycerol | 7 parts |
| Isopropyl alcohol | 3 parts |
| Lithium hydroxide | 1 part |
| 1,1-Dimethylurea | 3 parts |
| Glutarimide | 16 parts |
| Water | 68 parts |

Ink composition of Example 12:
| | |
|---|---|
| C.I. Food Black 1 | 2 parts |
| Diethylene glycol | 15 parts |
| 1,1-Diethylurea | 1 part |
| Succinimide | 12 parts |
| Water | 70 parts |

Ink composition of Example 13:
| | |
|---|---|
| C.I. Direct Black 168 | 2 parts |
| C.I. Food Black 2 | 0.5 part |
| Thiodiglycol | 8 parts |
| 1,1-Diethylurea | 3 parts |
| Succinimide | 8 parts |
| Isopropyl alcohol | 2.2 parts |
| Lithium hydroxide | 0.2 part |

-continued

| | |
|---|---|
| Water | 76.1 parts |
| Ink composition of Example 14: | |
| C.I. Direct Black 168 | 1.8 parts |
| C.I. Food Black 1 | 0.2 part |
| Thiodiglycol | 5 parts |
| Triethylamine | 5 parts |
| Succinimide | 4 parts |
| Water | 84 parts |

Comparative Examples 1 to 6

After their corresponding components as described below were mixed and thoroughly stirred into solutions, the resulting solutions were then separately filtered under pressure through a "Fluoropore Filter" (trade name; product of Sumitomo Electric Industries, Ltd.) having a pore size of 0.45 μm, thereby preparing respective inks according to Comparative Examples.

| | |
|---|---|
| Ink composition of Comparative Example 1: | |
| C.I. Direct Black 154 | 3 parts |
| Diethylene glycol | 10 parts |
| Isopropyl alcohol | 7 parts |
| Water | 80 parts |
| Ink composition of Comparative Example 2: | |
| C.I. Direct Black 2 | 4 parts |
| Triethylene glycol | 10 parts |
| Water | 86 parts |
| Ink composition of Comparative Example 3: | |
| C.I. Direct Black 154 | 3 parts |
| Diethylene glycol | 10 parts |
| Isopropyl alcohol | 4 parts |
| Glutarimide | 4 parts |
| Water | 79 parts |
| Ink composition of Comparative Example 4: | |
| C.I. Direct Black 154 | 3 parts |
| Diethylene glycol | 10 parts |
| Isopropyl alcohol | 7 parts |
| Triethanolamine | 4 parts |
| Water | 76 parts |
| Ink composition of Comparative Example 5: | |
| C.I. Direct Black 2 | 3 parts |
| Glycerol | 5 parts |
| 1,1-Dimethylurea | 10 parts |
| Triethanolamine | 2 parts |
| Isopropyl alcohol | 3 parts |
| Water | 77 parts |
| Ink composition of Comparative Example 6: | |
| C.I. Direct Black 2 | 3 parts |
| Diethylene glycol | 10 parts |
| Isopropyl alcohol | 7 parts |
| Lithium hydroxide | 1 part |
| Water | 79 parts |

Using each of the inks obtained in Examples 1 to 14 and Comparative Examples 1 to 6, a printing test was conducted using, as an ink-jet recording apparatus, an On-Demand type ink-jet printer making use of a heating element as an ejection-energy source to evaluate their (1) water resistance, (2) frequency response characteristics and (3) print quality in accordance with the following respective standards. The results are given in Tables 1 and 2.

Incidentally, the above-described ink-jet recording apparatus was operated under the following printing conditions:
Drive voltage: 26 V
Resistance of a heating resistor: 150 Ω
Frequency: 4 kHz.

Methods and Standards for Evaluation (1) Water Resistance (a)

After an ink to be tested was charged into the printer to print English characters and numerals and solid areas on commercially-available woodfree paper, the printer was stopped and the resulting print was left over for at least 1 hour, followed by measurement of the image density of the print by a "Macbeth RD915" (trade name; manufactured by Macbeth Company). After the print was then immersed for 3 minutes in a container filled with water, it was allowed to stand and dried to measure its image density again, whereby the percent retention of the image density was calculated. The water resistance was evaluated by ranking the value in accordance with the following standard:
◯: Percent retention of image density not lower than 80%;
x: Percent retention of image density not higher than 65.

(2) Water Resistance (b)

After English characters and numerals were printed on commercially-available woodfree paper by the printer, and the resulting print was left over for 1 day at room temperature, a great amount of water was sprayed on the print by a sprayer. After the print was dried, ease in reading the printed English characters and numerals was determined by a naked eye, and the water resistance was evaluated in accordance with the following standard:
◯: The ease in reading English characters and numerals remained unchanged before and after spraying a great amount of water, and their density also remained thick;
Δ: English characters and numerals were easy to read even after spraying a great amount of water, but their density became thin;
x: English characters and numerals were hard to read after spraying a great amount of water, and their density also became thin.

(3) Frequency Response Characteristic

The resulting print was observed by the naked eye with respect to its printing conditions, namely, conditions of blurred characters and blanks, and defective ink-droplet impact such as splash and slippage to evaluate the frequency response characteristic by ranking the conditions in accordance with the following standard:
◯: The follow-up condition of the ink to the frequency was substantially good, and none of blurred characters, blanks and defective ink-droplet impact were observed upon printing of characters, but blurred characters were slightly recognized upon solid printing;
Δ: None of blurred characters and blanks were observed, but defective ink-droplet impact was partly recognized upon printing of characters, and upon solid printing, blurred characters and blanks were observed at portions of about one-third of the whole solid printed area;
x: Blurred characters and blanks were observed to a great extent upon solid printing, and blurred characters and defective ink-droplet impact were also recognized to a large extent upon printing of characters.

(4) Evaluation of Print Quality

English characters and numerals were printed on commercially-available woodfree paper by the printer, and the resulting print was left over for at least 1 hour. The print was then observed by a microscope and naked eyes to evaluate the print quality by ranking the degree of sharpness of the letters and whisker-like feathering occurred on the letters in accordance with the following standard:

⊚: The letters were sharp, and no whisker-like feathering occurred;
○: The letters were sharp, but whisker-like feathering slightly occurred;
△: The letters were dull, or whisker-like feathering occurred to a great extent;
x: The letters were dull, and whisker-like feathering also occurred to a great extent.

(5) Evaluation of Jetting Ability

After an ink to be tested was charged into the printer, and the printer was left over for 1 week without capping the head under the environment of normal temperature and humidity, English characters and numerals and solid areas were printed on commercially-available woodfree paper. The jetting ability was evaluated by ranking the condition of the resulting print in accordance with the following standard:

⊚: None of blurred characters, splash and slippage were observed in both English characters and numerals and solid printed areas from the beginning of printing;
○: Splash and slippage were slightly observed in both English characters and numerals and solid printed areas from the beginning of printing, but blurred characters were not recognized in the solid printed areas;
△: Splash, slippage and jetting failure were observed in both English characters and numerals and solid printed areas from the beginning of printing, and blurred characters were recognized in the solid printed areas at the beginning of printing;
x: Splash, slippage and jetting failure were often observed in both English characters and numerals and solid printed areas from the beginning of printing, and blurred characters and also blanks were recognized in the solid printed areas at the beginning of printing.

According to the inks of this invention, as described above, the water resistance of prints can be improved without adversely affecting the image quality of the prints and the like with respect to so-called plain paper such as woodfree paper, medium-quality paper, bond paper and regenerated paper, commonly used in offices.

Further, according to the inks of this invention, recording can be conducted without the least problem and with high reliability in an ink-jet recording system even after stored for a long period of time.

What is claimed is:

1. An ink comprising a recording agent and a liquid medium dissolving or dispersing the recording agent therein, wherein the ink contains an imide compound and at least one compound selected from the group consisting of urea, thiourea and derivatives thereof, and volatile alkaline compounds, and wherein the proportion of the imide compound and volatile alkaline compound to be contained in the ink is 1:1 to 8:1 by weight.

2. The ink according to claim 1, wherein the imide compound is at least one selected from the group consisting of succinimide, glutarimide, maleimide, diglycolimide and glutazine.

3. The ink according to claim 1, wherein the volatile alkaline compound is at least one selected from the group consisting of ammonia, monomethylamine, diethylamine, triethylamine, monoethylamine, dimethylamine and trimethylamine.

4. The ink according to claim 1, wherein the proportion of the imide compound and compound selected from the group consisting of urea, thiourea and the derivatives thereof to be contained in the ink is 1:3 to 10:1 by weight.

5. The ink according to claim 1, wherein the compound selected from the group consisting of urea, thiourea and the derivatives thereof is contained in a proportion of from 0.1% to 20.0% by weight based o the total weight of the ink.

6. The ink according to claim 1, wherein the volatile alkaline compound is contained in a proportion of from 0.1% to 20.0% by weight based on the total weight of the ink.

7. An ink-jet recording method comprising ejecting droplets of an ink out of an orifice in accordance with a recording signal to make a record on a recording material, wherein the ink comprises a recording agent and a liquid medium dissolving or dispersing the recording agent therein, and contains an imide compound and at least one compound selected from the group consisting of urea, thiourea and derivatives thereof, and volatile alkaline compounds, and wherein the proportion of the imide compound and volatile alkaline compound to be contained in the ink is 1:1 to 8:1 by weight.

8. The ink-jet recording method according to claim 7, wherein the proportion of the imide compound and compound selected from the group consisting of urea,

TABLE 1

| Evaluation properties | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Water resistance (1) | ○ | ○ | ○ | ○ | ○ | ○ | ○ | ○ | ○ | ○ | ○ | ○ | ○ | ○ |
| Water resistance (2) | ○ | ○ | ○ | ○ | ○ | ○ | ○ | ○ | ○ | ○ | ○ | △ | ○ | △ |
| Frequency response characteristic | ○ | ○ | ○ | ○ | ○ | ○ | ○ | ○ | ○ | ○ | ○ | ○ | ○ | ○ |
| Print quality | ⊚ | ⊚ | ⊚ | ⊚ | ⊚ | ⊚ | ⊚ | ⊚ | ⊚ | ⊚ | ⊚ | ⊚ | ⊚ | ○ |
| Jetting ability | ⊚ | ⊚ | ⊚ | ⊚ | ⊚ | ⊚ | ⊚ | ⊚ | ⊚ | ⊚ | ⊚ | ○ | ⊚ | △ |

TABLE 2

| Evaluation properties | Comparative Example | | | | | |
|---|---|---|---|---|---|---|
| | 1 | 2 | 3 | 4 | 5 | 6 |
| Water resistance (1) | x | x | x | x | x | x |
| Water resistance (2) | x | x | x | x | x | x |
| Frequency response characteristic | ○ | ○ | c | ○ | △ | ○ |
| Print quality | x | ⊚ | ○ | x | x | x |
| Jetting ability | x | △ | ○ | ○ | △ | x | thiourea and the derivatives thereof to be contained in the ink is 1:3 to 10:1 by weight.

9. The ink-jet recording method according to claim 7, wherein the recording material is woodfree paper.

10. The ink-jet recording method according to claim 7, wherein the ink droplets are ejected by applying thermal energy to the ink.

11. A recording unit comprising an ink container portion with an ink held therein and a head from which the ink is ejected in the form of ink droplets, wherein said ink is the ink as set forth in claim 1.

12. The recording unit according to claim 11, wherein the head is a head which causes thermal energy to act on the ink to eject its droplets.

13. The recording unit according to claim 11, wherein the ink container portion is formed of polyurethane, cellulose or polyvinyl acetate.

14. An ink cartridge comprising an ink container portion with an ink held therein, wherein said ink is the ink as set forth in claim 1.

15. The ink cartridge according to claim 14, wherein the ink container portion is made of a polyolefin at its surface with which the ink comes into contact.

16. An ink-jet recording apparatus comprising a recording unit having an ink container portion with an ink held therein and a head from which the ink is ejected in the form of ink droplets, wherein said ink is the ink as set forth in claim 1.

17. The ink-jet recording apparatus according to claim 16, wherein the head is a head which causes thermal energy to act on the ink to eject its droplets.

18. The ink-jet recording apparatus according to claim 16, wherein the ink container portion is formed of polyurethane, cellulose or polyvinyl acetate.

19. An ink-jet recording apparatus comprising a head from which the ink is ejected in the form of ink droplets, an ink cartridge having an ink container portion with an ink held therein, and an ink feeder for feeding the ink from the ink cartridge to the recording head, wherein said ink is the ink as set forth in claim 1.

20. The ink-jet recording apparatus according to claim 19, wherein the head is a head which causes thermal energy to act on the ink to eject its droplets.

21. The ink-jet recording apparatus according to claim 19, wherein the ink container portion is made of a polyolefin at its surface with which the ink comes into contact.

* * * * *

UNITED STATES PATENT AND TRADEMARK OFFICE
CERTIFICATE OF CORRECTION

PATENT NO. : 5,213,613  
DATED : May 25, 1993  
INVENTOR(S) : Nagashima et al.

Page 1 of 2

It is certified that error appears in the above-indentified patent and that said Letters Patent is hereby corrected as shown below:

Title Page:
[56] References Cited

U.S. PATENT DOCUMENTS

After "5,019,164   5/1991   Tomita et al. ..... 106/20 R" insert:

--5,078,790   1/92   Tochihara et al. ..... 106/20  
  5,080,716   1/92   Aoki et al. .......... 106/20  
  5,125,969   6/92   Nishiwaki et al. ..... 106/22  
  5,131,949   7/92   Tochihara et al. ..... 106/20  
  5,132,700   7/92   Tochihara et al. ..... 346/1.1  
  5,135,571   8/92   Shirota et al. ....... 106/22  
  5,137,570   8/92   Nishiwaki et al. ..... 106/22

FOREIGN PATENT DOCUMENTS 58-80366   5/83   Japan--.

COLUMN 1:

Line 38, "The" should read --the--.

COLUMN 2:

Line 57, "inventor has" should read --inventors have--.

UNITED STATES PATENT AND TRADEMARK OFFICE
CERTIFICATE OF CORRECTION

PATENT NO. : 5,213,613

DATED : May 25, 1993

INVENTOR(S) : Nagashima et al.

It is certified that error appears in the above-indentified patent and that said Letters Patent is hereby corrected as shown below:

COLUMN 3:

Line 3, "even" should be deleted; and
Line 7, "more" should read --in more--.

COLUMN 5:

Line 47, "waterdrops" should read --water drops--.

COLUMN 6:

Line 9, delete "and moreover".

COLUMN 12:

Line 27, "ease" should read --the ease--.

COLUMN 14:

Line 37, "o" should read --on--.

Signed and Sealed this

Seventeenth Day of May, 1994

Attest:

BRUCE LEHMAN

Attesting Officer

Commissioner of Patents and Trademarks